MULTIFREQUENCY TELEPHONE SWITCHING SYSTEM

Filed June 20, 1951 7 Sheets-Sheet 1

INVENTORS A. L. JEANNE
A. C. KELLER
S. D. WHITE
BY R. D. Covell
ATTORNEY

Dec. 21, 1954 A. L. JEANNE ET AL 2,697,749

MULTIFREQUENCY TELEPHONE SWITCHING SYSTEM

Filed June 20, 1951 7 Sheets-Sheet 2

INVENTORS A. L. JEANNE
A. C. KELLER
S. D. WHITE
BY
R. D. Covell
ATTORNEY

MULTIFREQUENCY TELEPHONE SWITCHING SYSTEM

Filed June 20, 1951 7 Sheets-Sheet 3

INVENTORS A. L. JEANNE
A. C. KELLER
S. D. WHITE
BY R. D. Covell
ATTORNEY

INVENTORS A. L. JEANNE
A. C. KELLER
S. D. WHITE
BY R. D. Covell
ATTORNEY

Dec. 21, 1954 A. L. JEANNE ET AL 2,697,749

MULTIFREQUENCY TELEPHONE SWITCHING SYSTEM

Filed June 20, 1951 7 Sheets-Sheet 5

INVENTORS A. L. JEANNE
A. C. KELLER
S. D. WHITE

BY R. D. Covell

ATTORNEY

MULTIFREQUENCY TELEPHONE SWITCHING SYSTEM

Filed June 20, 1951 7 Sheets-Sheet 6

INVENTORS A. L. JEANNE
A. C. KELLER
S. D. WHITE
BY R. D. Covell
ATTORNEY

INVENTORS A. L. JEANNE
A. C. KELLER
S. D. WHITE
BY R. O. Covell
ATTORNEY

2,697,749
MULTIFREQUENCY TELEPHONE SWITCHING SYSTEM

Armand L. Jeanne, Garden City, and Arthur C. Keller, Bronxville, N. Y., and Samuel D. White, Stelton, N. J., assignors to Bell Telephone Laboratories, Incorporated, New York, N. Y., a corporation of New York Application June 20, 1951, Serial No. 232,642
15 Claims. (Cl. 179—16)

This invention relates to telephone signaling systems and more particularly to a system in which all characters of a called station designation may be automatically transmitted simultaneously to a central office and there be instantaneously registered.

In automatic telephone systems heretofore known to the art the characters of a called station designation have generally been transmitted from the calling station in the form of a plurality of successive groups of electrical impulses generated by operation of well-known dialing means. In some variations push-buttons have been provided as a means of transmitting successive impulse groups, and in the well-known key-pulsing systems these push-buttons operate to transmit selective combinations of signal tones for each successive digit. In most of these automatic systems registers are employed at the central office to store the various digits of the called station designation, and in busy offices where a large number of different calling subscribers may originate calls at the same time a large number of expensive registers must be provided in order to assure the subscribers prompt service.

The number of registers necessary in any office is a function not only of the volume of originating traffic but also of the length of time required for each subscriber to complete his dialing operation, since one register can only serve one subscriber at any given time. Therefore, it is apparent that any means for increasing the calling subscriber's speed of dialing, and reducing the time required for transmitting the called station designation to the central office, may reduce the over-all cost of the telephone plant by reducing the total number of registers necessary in each office and thus enable speedier and more economical service to be given telephone subscribers. In the prior art systems, since the dialing operation is performed after a register at the central office has been seized, a dilatory subscriber may thus monopolize a costly segment of central office switching equipment for an unduly long period of time, thereby necessitating the provision of a greater number of registers in the central office at a corresponding increased cost of service to all subscribers.

One of the objects of the present invention is to provide a telephone signaling system wherein the dialing operation may be completely performed by the subscriber prior to the seizure of a register in the central office.

Another object of the invention is to provide a telephone signaling system in which the entire called station code designation may be transmitted from a calling subscriber's station to a central office register in a very brief instant of time, as by a single short group of frequencies.

Still another object of the invention is to provide a telephone signaling system in which all of the digits of a called station code designation may be simultaneously registered at the central office within a fraction of a second.

Another object of the invention is to provide a telephone subscriber's station capable of transmitting simultaneously all digits of a called station code designation under the control of power supplied from the central office.

A further object of the invention is to provide an automatic telephone switching system in which called office code designation signals may be translated directly in the marker in a very short interval of time without the necessity of calling in a separate pretranslator, dropping the pretranslator, and then calling in the marker when the called number registration is completed.

The manner in which the objects of the invention are achieved is by the simultaneous, rather than sequential, transmission from the calling subscriber's station of all the required information necessary to identify the called subscriber's station, and by simultaneous registration of this calling information in the central office with which the calling subscriber's station is connected. This is accomplished by means of a plurality of differently tuned audio frequency generators, various code combinations of which are selected by the preset dialing operation of the calling subscriber.

The novel features of the call transmitter disclosed but not claimed herein are claimed in copending divisional application, Serial No. 443,788 filed on July 16, 1954.

Further features and advantages of the invention may be apparent from a reading of the detailed description which follows in reference to the accompanying drawings wherein.

Figure 8:
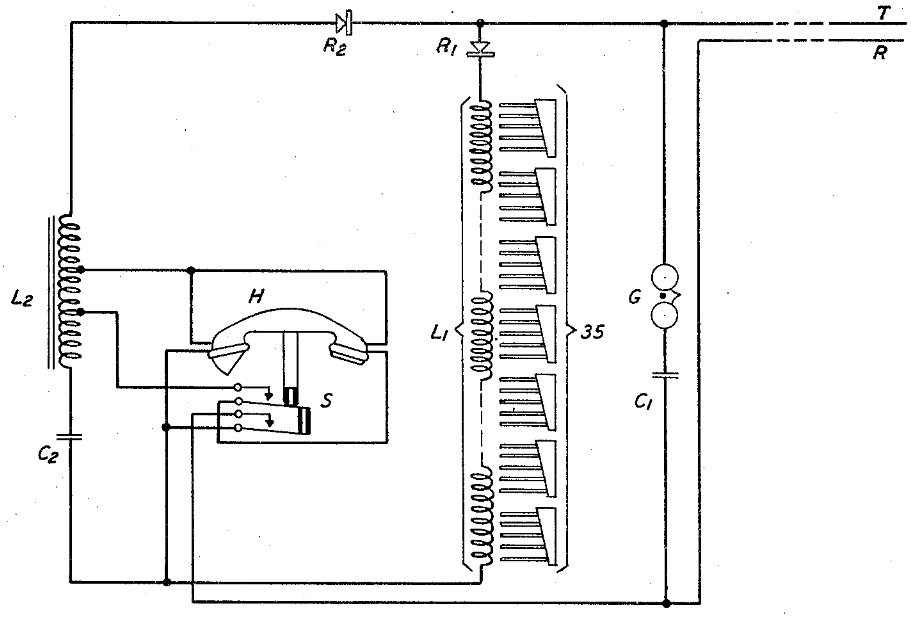
Fig. 8 is a schematic diagram illustrating the electrical circuit of the station set the external appearance of which is disclosed by the perspective drawing of Fig. 1.
Figure 9:
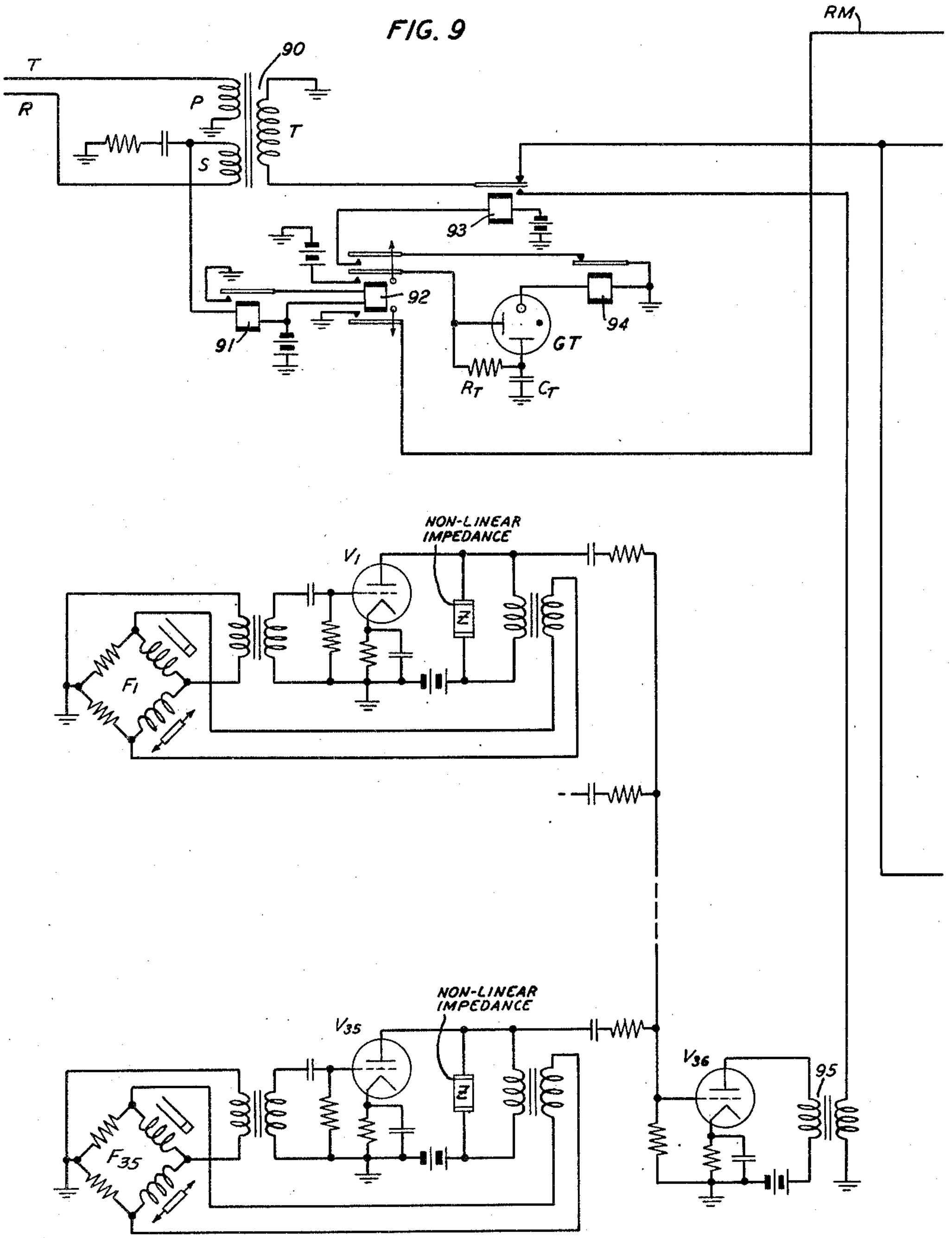
Figure 10:
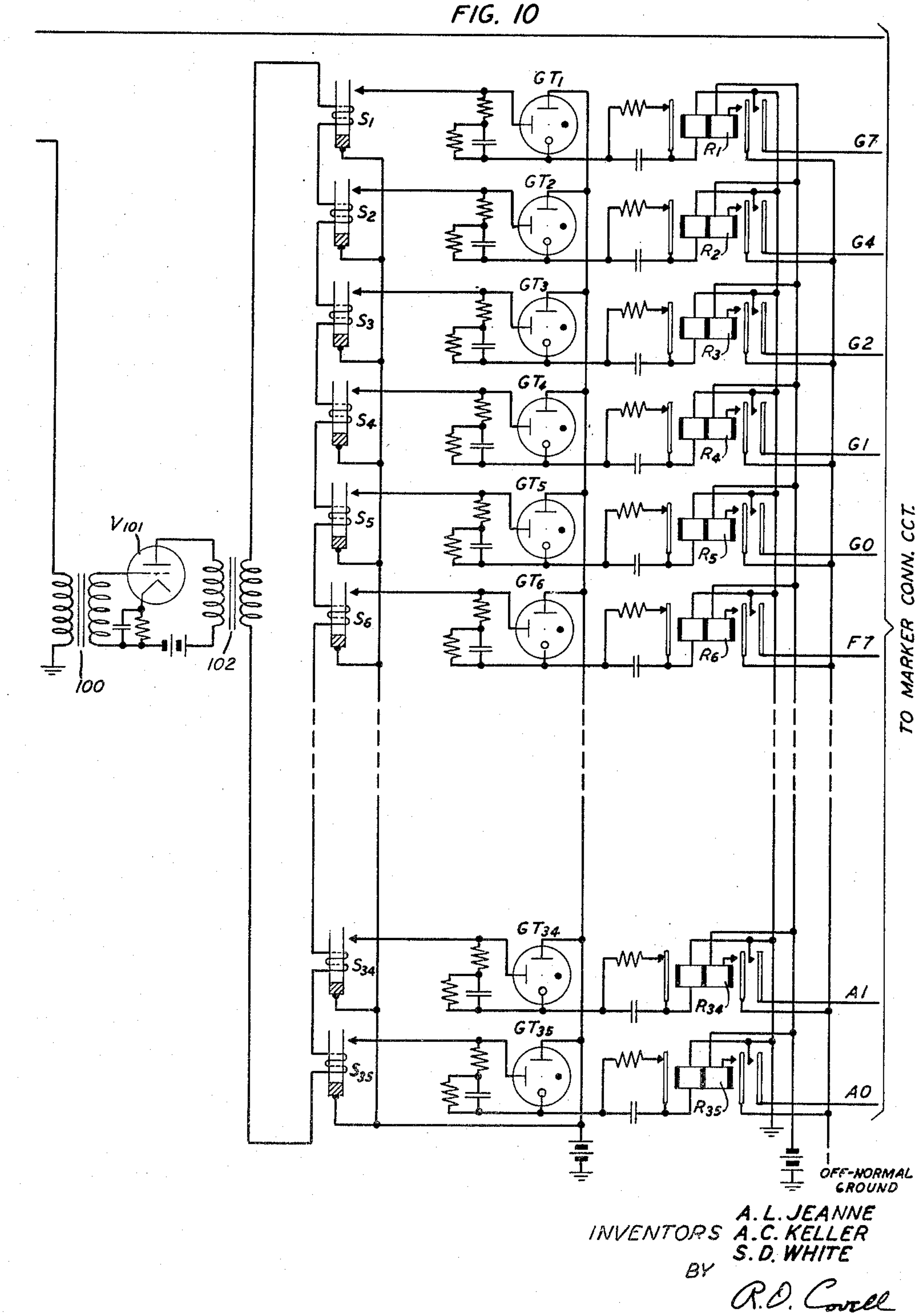
Figure 11:
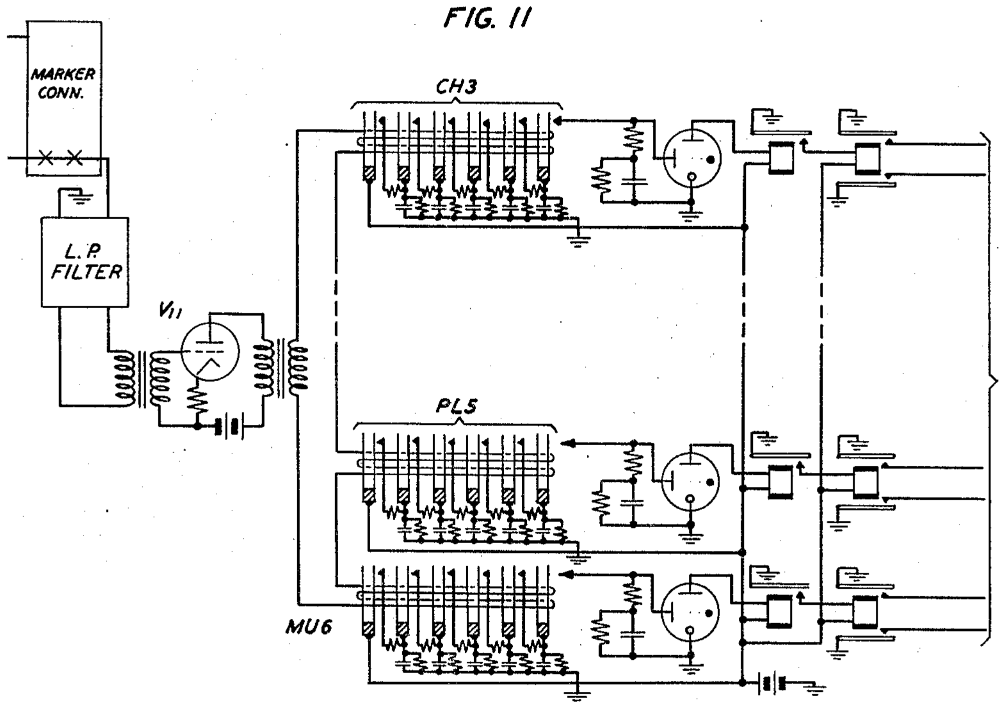
Figure 12:
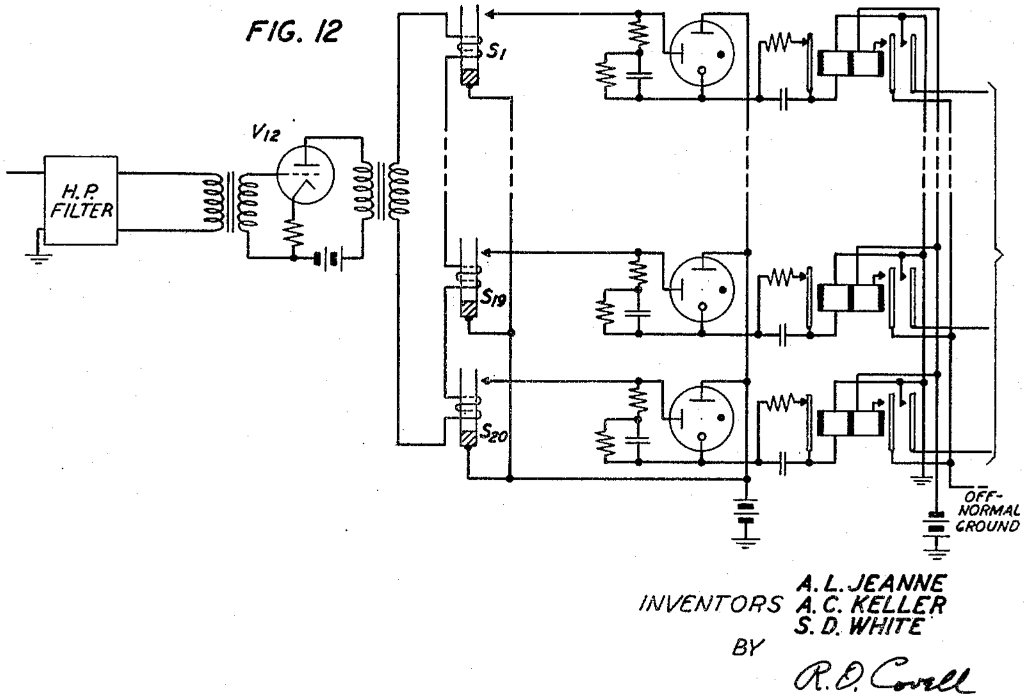
Figure 13:
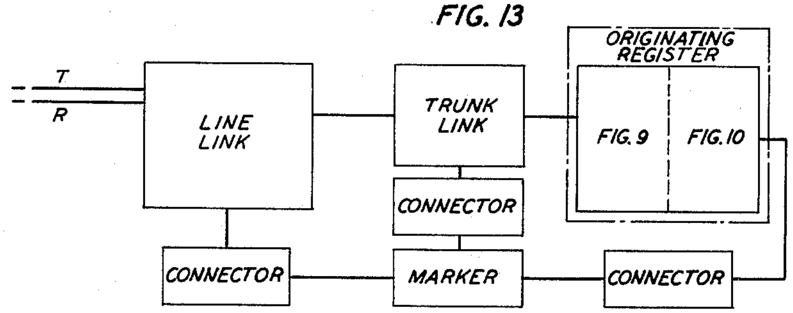
Figure 15:
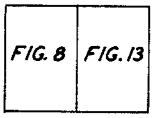
Figure 16:
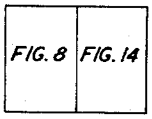
Figures 14, 17, 18:
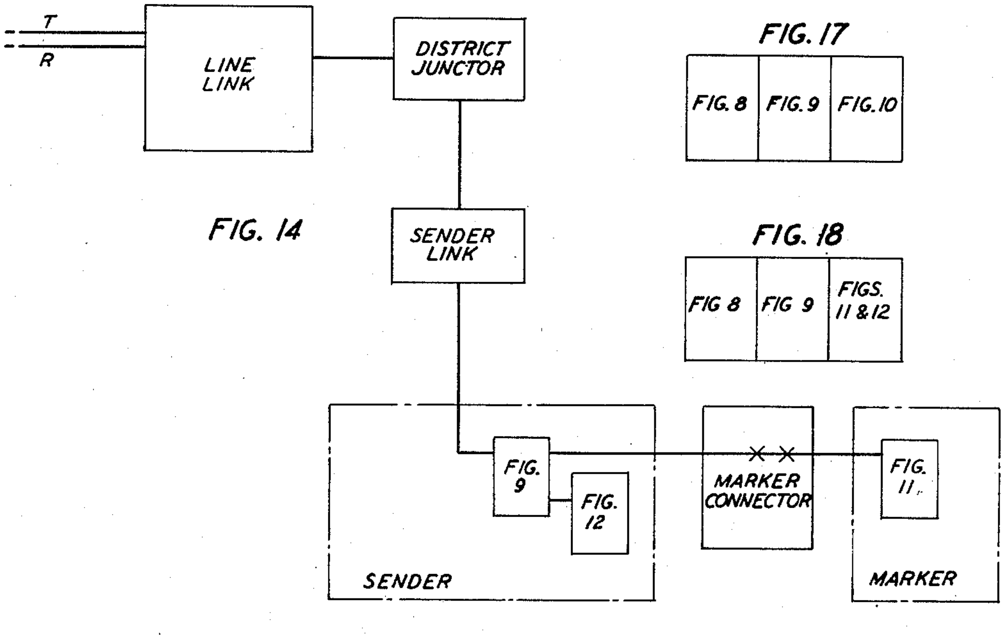

Fig. 9 and Fig. 10 when placed side by side disclose in schematic circuit diagram the essential elements of a central office multifrequency power supply and originating register circuits for a central office as comprehended by the present invention when adapted to a cross-bar telephone switching system of the general type disclosed by copending application of A. J. Busch, Serial No. 57,394, filed October 29, 1948, now Patent 2,585,904. A plurality of individually tuned signal sources together with connecting relays and coupling coils appear in Fig. 9 while a plurality of reed selectors tuned to the same frequencies as the signal sources, with their associated gas discharge tubes and register relays appear in Fig. 10;

Fig. 11 and Fig. 12 taken together comprise an additional circuit, alternative to the circuit of Fig. 10, illustrating how the invention may be utilized to reduce the holding time of a cross-bar marker and also to eliminate the necessity for a part of the marker translator in a cross-bar system of the general type disclosed by Patent 2,235,803 to W. W. Carpenter, March 18, 1941;

Fig. 13 is a block diagram which may be connected with the subscriber station of Fig. 8 to illustrate the general manner in which the invention may be incorporated into a modern cross-bar type of telephone switching system as disclosed by the copending application of A. J. Busch, Serial No. 57,394, filed October 29, 1948, now Patent 2,585,904;

Fig. 14 is another block diagram which may be connected with the subscriber station of Fig. 8 and illustrates an alternative arrangement in which the invention is adapted to a telephone switching system as disclosed by Patent 2,235,803 to W. W. Carpenter, March 18, 1941;

Fig. 15 shows the order in which Fig. 8 and Fig. 13 are to be combined;

Fig. 16 shows the order in which Fig. 8 and Fig. 14 are to be combined;

Fig. 17 shows the order in which Fig. 8, Fig. 9 and Fig. 10 are to be arranged to disclose one embodiment of the invention; and Fig. 18 shows the order in which Fig. 8, Fig. 9, Fig. 11 and Fig. 12 are to be combined to disclose another embodiment of the invention.

In the preferred embodiments illustrated by the accompanying drawings the subscriber's station and associated central office circuits are adapted to a seven-digit numbering system as may be required in large metropolitan areas where as many as ten million stations may be served by a common numbering system. Thirty-five different signal frequencies are employed in seven separate groups of five distinct frequencies for each group. By selecting two out of five frequencies in each group any one of ten different values may be secured for each digit. Thus, since only two frequencies are required to designate any one digit, all seven digits may be designated by the transmission of only fourteen frequency tones out of the total of thirty-five different frequencies available. These fourteen distinctive signals are simultaneously transmitted from the calling subscriber's station to the central office where they are simultaneously registered by suitable frequency selective detector circuits which control the operation of register relays to apply ground to fourteen selected leads.

From the register circuit on to the final operation of connecting the called station, the switching operations of the central office may be the same as those now employed in any one of a number of well-known telephone switching systems, such as the cross-bar systems disclosed by the aforementioned Patent 2,235,803 and copending application of A. J. Busch. It will be realized, of course, that the improvement in speed of subscriber dialing, and speedy registration of dialed information, as provided by the present invention may be employed with any type of telephone switching system and is not limited only to those systems which are now known and in use.

For a more detailed understanding of the invention we refer now to the appended drawings. The operation of the system may best be understood by a study of the circuit diagrams. Therefore, we refer first to the schematic drawing of Fig. 8 wherein it is seen that the conventional telephone dial which in other types of station sets serves to provide open and close pulses in the telephone line is here omitted, and in lieu thereof a coil $L_1$ in series with a unidirectional current device, such as varistor $R_1$, is connected across the line T—R when the switchhook S is closed by removal of the handset from its cradle. The coil $L_1$ surrounds and is inductively coupled to all of the thirty-five tuned reed vibrators which are arranged in seven separate groups of five reeds each as shown at 35. Small permanent magnets, not shown in the schematic of Fig. 8, but associated with the manually adjustable code wheels as illustrated by other figures of the structural drawings, enable the subscriber to provide closer coupling between selected pairs of reeds in each set and the encompassing inductance coil $L_1$. Thus, those selected reeds which are close coupled by the subscriber's dialing manipulation are conditioned to be energized and set in vibration by alternating electrical energy of the corresponding frequency which may be impressed upon the coil $L_1$ from the central office power supply. Conversely, when the closely coupled selected reeds are thus set in vibration and the power supply from the central office removed from connection with coil $L_1$, the mechanical vibration of selected reeds will produce an induced alternating-current voltage of corresponding frequency in the surrounding coil $L_1$.

A second unidirectional current device such as varistor $R_2$ is connected in series with the talking circuit of the station handset H, as shown in Fig. 8. $R_2$ is oppositely poled from $R_1$ so that when positive battery is connected to the tip side of the line at the central office, the talking circuit of the station set is effectively blocked by the high impedance of $R_2$, while the reed coil signaling circuit $L_1$ presents a relatively low impedance to the line and is thus rendered conductive when a calling signal is originated. After the called station information has been transmitted from the subscriber's station and registered at the central office, and when the calling connection has been established, automatic switching means (not shown) in the central office would reverse the line polarity so that the signaling circuit $L_1$, $R_1$ presents a high impedance to the line while $L_2$, $R_2$ presents a relatively low impedance to render the talking circuit conductive. Condenser $C_1$ in series with the ringer G which may be a conventional gong type ringer, blocks direct current from flowing through the ringer, while condenser $C_2$ in series with the telephone induction coil $L_2$ forces direct current through the transmitter where it may be modulated by speech in a manner well known to the art.

For the sake of simplicity in understanding the operation of the invention, the subscriber's station of Fig. 8 is shown connected by tip and ring conductors of the line designated T—R to the register circuit of Figs. 9 and 10. Of course, it will be understood that in order for a large number of subscribers' stations, such as the one illustrated by Fig. 8, to have access to the register, as illustrated by Figs. 9 and 10, some appropriate form of automatic switching means must be provided between the two circuits. This may be accomplished by any type of automatic machine switching apparatus such as line finders, cross-bar switches, or any other type of appropriate switching device.

The manner in which the signaling system of the invention may be embodied in cross-bar type switching systems is herein disclosed in two forms. First, the invention may be used to effect the transmission and registration of the called number information from a calling station, this information being stored until a common control circuit becomes available. This use of the invention is illustrated by the arrangement of Fig. 13 which shows how the invention may be adapted to a cross-bar system of the type disclosed by copending application of A. J. Busch, Serial No. 57,394, filed October 29, 1948, now Patent 2,585,904, the full disclosure of which is incorporated herein by reference.

The second embodiment of the invention is illustrated by Fig. 14 of the drawings wherein the invention has been adapted to a cross-bar system of the type disclosed by Patent 2,235,803 to W. W. Carpenter, the disclosure of which is likewise herewith incorporated by reference thereto. In this form the signaling system of the invention works directly into the common control equipment without the necessity of first registering the called office code information. Thus, in this arrangement, immediate translation of the input signals affords a saving in central office switching equipment as otherwise required for interpreting the information in the system of the aforesaid Busch application.

Referring now in greater detail to Fig. 13 and its relation to the disclosure of the copending application of A. J. Busch, the T—R leads of Fig. 13 are to be connected with the calling subscriber's station of Fig. 8, as shown by the arrangement of Fig. 15. When the subscriber removes his receiver from the hook, relays in the line link circuit function as described in the aforesaid application of Busch to request a connection to an originating register termination on the trunk link frame. A line appearance on the line link frame for a line is similar to one of the line appearances shown in Fig. 5 of the Busch application. An appearance of an originating register on the trunk link frame is similar to that shown in Fig. 70 of the Busch application, in which conductors 7007 and 7706 correspond to the tip and ring conductors, respectively, interconnecting the trunk link and Fig. 9 of the system represented in Fig. 13. Responsive to initiation of the call, a marker is associated with the line link frame on which the calling line terminates and with a line link frame on which an idle originating register terminates, and the marker thereupon effects operation of the switches on these frames to establish a connection between the calling line and an originating register. It is to be understood that other relays required to assist the trunk link frame and marker in establishing a connection to the register will be similar to those shown for the originating register in the Busch application. This connection between the calling line and an originating register is known as the dial tone connection because, in the prior art systems, dial tone is supplied thereby to the calling subscriber. However, in this embodiment of the present invention this connection supplies a composite signal comprising thirty-five combined tones from the signal generators of Fig. 9, as will hereinafter be described more fully in detailed reference to the circuit of Fig. 9 when arranged with Fig. 8 and Fig. 10 in the manner shown by Fig. 17. All of the digits of the called number will be received simultaneously by the register relays of Fig. 10, as hereinafter described in greater detail. The register output conductors A0 through G7 in Fig. 10 of the accompanying drawings, terminate on multicontact relays of a marker connector, such as Fig. 144 of the copending Busch disclosure, and the desired connection is established as described by the disclosure of Busch.

Fig. 14 of the appended drawings illustrates the manner in which the signaling system of the invention may be incorporated into the sender and marker of another cross-bar telephone system as disclosed by Fig. 29 to Fig. 43 of Carpenter Patent 2,235,803, wherein the called office code portion of the called number is transmitted through the sender and marker connector directly into the marker for immediate action in translating the office code to a route. When the receiver is removed from the switchhook a connection is established as described in Patent 2,235,803 from the line link through a district junctor and a sender link into the sender. The tip and ring conductors of the sender, conductors 2450 and 2451 in the Carpenter patent, are connected to a receiving circuit such as Fig. 9 of the appended drawings in place of the dial pulse receiving relays as shown in Fig. 36 of the Carpenter patent. The numerical portion of the called number is recorded on the register relays shown in Fig. 12 of the appended drawings which replace the verticals of the cross-bar switch shown in Fig. 32 and Fig. 33 of the Carpenter patent. As soon as a call reaches the sender, the sender will request the service of a marker by grounding the RM lead, seen in Fig. 9 of the appended drawings. The RM lead herein corresponds to lead 3132 of the Carpenter patent. In this embodiment of the invention each marker contains a signal receiver such as Fig. 11 of the appended drawings, only the office code portion of the called number being received. This signal receiver functions as a translator thereby making it possible to eliminate that portion of the marker shown in Figs. 49 to 76 of the Carpenter patent which are needed to operate the required route relay. When the called office code signals are received by the circuit of Fig. 11 herein, the required route relay is operated, which relay is equivalent to relay 6902 in the disclosure of the Carpenter patent. The operation of the required route relay determines how the call will be established and controlled in the originating office, and also controls the actual setting up of the linkages from the district junctor to an out trunk.

We now refer in greater detail to Fig. 9 of the drawing where the subscriber's line T—R is connected to the register circuit. This register circuit operates in the following manner. When the subscriber's station has been connected to the register through coupling coil 90 as shown in Fig. 9, the relay 91 is operated through the tip and ring connections, the subscriber's loop and the windings of coupling coil 90. Relay 91 closes a circuit to operate relay 92. Relay 92 operated completes a circuit to operate relay 93 and also applies a positive potential to the timing circuit $R_T$ and $C_T$ connected with the gas discharge tube GT.

Operation of the relay 93 applies tone from the multifrequency power supply shown in the lower portion of Fig. 9 to the T winding of coupling coil 90 from whence the tone power is induced to the P and S windings and thus transmitted to the subscriber's station of Fig. 8 in much the same manner that ordinary dial tone is supplied in other types of machine switching systems. However, in the present invention the tone applied to the subscriber's station is not ordinary dial tone but instead is a signal comprising all thirty-five frequencies to which the thirty-five individual station set reeds are tuned. When this signal is received at the subscriber's station, the particular fourteen preselected reeds which have been closely coupled to the inductance coil by manipulation of the subscriber's dialing wheels as will hereinafter be explained in greater detail, are set into vibratory motion, while the remaining unselected reeds at the station are not so energized. After a very short interval of time, which is determined by the value of resistance and capacitance in $R_T$ and $C_T$, a time which is only long enough to insure that the fourteen selected reeds at the subscriber's station have reached substantially full amplitude of vibration, the gas discharge tube GT becomes conductive and operates relay 94 which releases relay 93. With the release of relay 93 the T winding of the coupling coil 90 is disconnected from the multifrequency tone sources and transferred to the input coil of transformer 100 in the register circuit of Fig. 10. In this condition, the fourteen vibrating reeds in the subscriber's station set induce a signal in the coupling coil $L_1$ of Fig. 8 which comprises all fourteen different frequency components. This composite signal is now transmitted from the subscriber's station to the central office where it is impressed as a fourteen-frequency alternating-current voltage upon the register input 100 of Fig. 10.

Detailed reference is now made to the circuit of Fig. 10. Here the fourteen-frequency signal received from the subscriber's station is amplified by vacuum tube $V_{101}$ and connected through transformer 102 to the windings of the thirty-five separate vibrating reed selectors $S_1$ through $S_{35}$. These thirty-five selectors are tuned to the same thirty-five frequencies to which the subscriber's set reeds are tuned, and those fourteen selectors which are tuned to the fourteen frequencies in the received signal from the subscriber's station will be energized and caused to vibrate, while the remaining reeds in the selector circuit are unenergized. When any one of these selectors is vibrated the closure of its vibrating contacts applies a potential to its associated gas discharge tube, such as $GT_1$ through $GT_{35}$, to cause that connected gas tube to become conductive. In this manner fourteen of the gas tubes $GT_1$ to $GT_{35}$ are operated and the current flow therethrough operates the corresponding fourteen register relays of the group $R_1$ through $R_{35}$ as seen in Fig. 10.

Each operated relay in the bank $R_1$ through $R_{35}$ locks itself up through a secondary winding, a make contact, and a lead to ground on an off-normal relay, and extinguishes its associated gas tube in the bank $GT_1$ through $GT_{35}$. Each operated relay also grounds one of the register output leads A0 through G7, which terminates on multicontact relays such as Fig. 144 of the copending Busch disclosure, whence the called connection is established as disclosed by Busch.

We now refer in greater detail to the multifrequency power supply sources disclosed by the bottom portion of the circuit drawing of Fig. 9. In the preferred form of multifrequency power supply disclosed in Fig. 9 of the drawing, a total of thirty-five separate vacuum tube oscillators, as illustrated by $V_1$ through $V_{35}$, are connected in parallel to the input circuit of a vacuum tube amplifier, as shown at $V_{36}$, the output of which is coupled through an appropriate transformer 95, through relay 93 operated, to the T winding of subscriber's coupling coil 90. The oscillators, as illustrated by $V_1$, are preferably amplifiers each of which has in its feedback circuit a vibrating reed selector filter, as shown by $F_1$, which is sharply tuned to a single frequency corresponding to the resonant frequency of one of the subscribers' station set reeds. These vibrating reed selector filters $F_1$ through $F_{35}$ are preferably of the type disclosed in the copending application of L. G. Bostwick, Serial No. 38,130, filed July 10, 1948, now Patent 2,630,482, although other suitable forms of narrow pass filters may be employed. With the circuit shown in Fig. 9 there is a phase shift of other than 0 or 180 degrees between the voltages in the bridge filter input and the filter output. The negative of this phase shift is provided in the resistance and capacitance input circuit to the grid of the amplifier tube so that the total phase shift of the circuit is 0 at the resonant frequency of the reed selector.

Of course, it will be understood that other forms of multifrequency generators may be employed as tone sources for the system without departing from the invention. For example instead of providing thirty-five reed selector controlled oscillators as illustrated by the circuit of Fig. 9, the system could be operated with thirty-five separate RC or LC controlled vacuum tube or transistor oscillators, or the necessary number of frequencies might be magnetically recorded on one or more tone wheels rotated at constant speed.

Another possible variation of the system would be to produce the desired multifrequency signaling tone directly at the subscriber's station without requiring multifrequency power from the central office. In such an arrangement, for example, the seven preset dials at the subscriber's station, could be adapted to unblock or select the fourteen reeds from the total of thirty-five therein provided, and those selected reeds could then be plucked mechanically by the subscriber pushing a button, or the fourteen unblocked reeds might be plucked by an electromagnet in the subscriber's station set which could be energized by a simple pulse from the central office at the proper time.

In order to provide automatic calling subscriber station identification for billing purposes, or for automatic message accounting, additional reeds may be built into the subscriber's station set in a manner to be energized during the origin of every call, and a corresponding set of additional selectors provided at the central office solely to identify the calling station. This arrangement will be particularly useful in identifying a calling subscriber on a multiparty line.

It will be obvious that the register need not be of the specific type illustrated by the circuit of Fig. 10, but that, for instance, vacuum tubes or transistors may be employed in lieu of the gas discharge tubes which are illustrated, or other circuit changes may be made within the scope of the invention.

Reference is now made to Fig. 11 and Fig. 12 of the drawings wherein is disclosed an alternative circuit which may be substituted for the circuit of Fig. 10 to adapt the invention to more rapid switching of both intra-office and outgoing calls by reducing the marker holding time, improving the method of translation, and by eliminating the need for a separate office code register in each sender. The manner in which these economies are achieved will be best understood by a brief recapitulation of the normal sequence of operations involved in office code translation by a cross-bar type of telephone switching system.

When a cross-bar marker is first seized on a dial tone call, by the act of a calling subscriber lifting his handset, the first major action of the marker is to determine the means of access to the originating register group for purposes of locating an idle register to which the connection may be established. In similar fashion, on intra-office and outgoing calls after the called and calling station information has been registered, the marker must determine the means of access to the various trunk groups applicable to the call and, in addition, obtain certain other trunk group information required for completing the connection. The major input signals consist of either a request for a register from the line-link frame, or the complete number dialed by a subscriber into the originating register, in the case of both intra-office and outgoing calls. As pointed out above, in reference to Fig. 8 through Fig. 10 of the drawings, much of the time now required for signaling and switching by sequential dial impulses may be saved by the means disclosed herein for transmitting the entire calling signal simultaneously.

With a telephone system as represented by the combination of Fig. 8, Fig. 9, Fig. 11 and Fig. 12 connected together, when the marker (of which Fig. 11 is a part) is seized by and connected to the subscriber's line T—R, of Fig. 8, through the marker connector, the marker has access to the thirty-five frequency tone supply of Fig. 9 which is applied to the subscriber's station of Fig. 8 as hereinbefore described. However, since with this system the process of registration is practically instantaneous, it is not necessary or feasible to follow the ordinary sequence of cross-bar switching operations in which the expensive marker is dropped during registration of called station information only to be recalled later to complete the call as directed by the registered information. Instead, the initial three digits which constitute the called office code, may be registered and translated directly in the marker. This is accomplished by means of a plurality of groups of vibrating reed selectors, as illustrated by CH3, PL5, MU6, etc. in Fig. 11. With this arrangement a call to a station served by the Chelsea 3 office, for example, will contain fourteen simultaneous signal tones, six of which designate the called office code, on a two-out-of-five frequency basis for each digit, and these six tones will simultaneously energize all six vibrating reed selectors of CH3 to instantaneously select a trunk route from the originating office to the Chelsea 3 office. The remainder of the called station designation, i. e., the last four digits of the called party's number, comprises eight distinctive tones which are registered simultaneously by eight of the twenty vibrating reed selectors $S_1$ through $S_{20}$, each with its associated gas tube and register relay, seen in Fig. 12.

Since the circuits of Fig. 11 and Fig. 12 function substantially in two separate parts, with the circuit of Fig. 11 showing means for directly selecting an appropriate trunk route, and the circuit of Fig. 12 showing means for registering the last four digits of the called number, separate amplifiers may be provided for both parts of the signal as illustrated by $V_{11}$ in Fig. 11 and $V_{12}$ in Fig. 12. If the tones allocated to the first three digits, or office code portion of the signal, are the fifteen lowest frequencies of the thirty-five frequencies employed, a low-pass filter may be placed ahead of the first amplifier, $V_{11}$ as seen in Fig. 11, to pass only this frequency band into the office code circuit of Fig. 11, while a high-pass filter ahead of $V_{12}$ excludes these lower frequencies from the station code circuit but permits the remaining twenty tones to pass through to $V_{12}$. Of course, it will be obvious that the band frequency allocations may be reversed and the higher frequencies may be employed for the office code designations and the lower frequencies for the station code, merely by interchanging the positions of the low-pass and high-pass filters, seen in Fig. 11 and Fig. 12, respectively. The system may even be operated without any band-pass filters and with but a single amplifier driving the reed selectors of both the office code and station code detection circuits, although the frequency division circuit disclosed in Fig. 11 and Fig. 12 is considered preferable.

Figure 1:
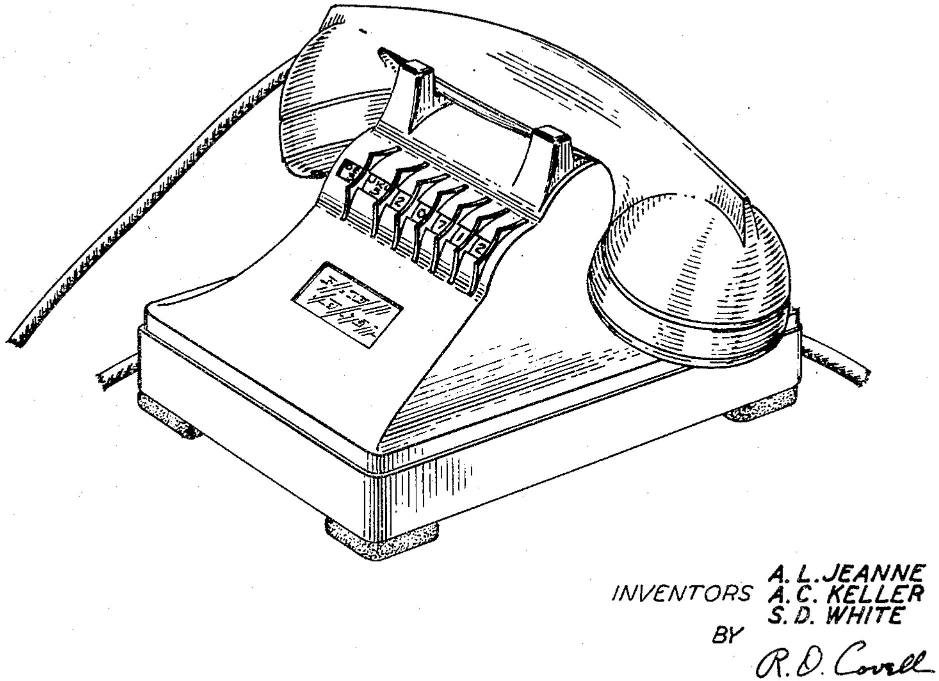
Fig. 1 is a perspective drawing representing an external view of a telephone station set as comprehended by the invention.

In order better to understand the internal construction of the subscriber's station set, a preferred embodiment of which is illustrated by the perspective drawing of Fig. 1 and the schematic circuit diagram of Fig. 8, reference is now made to the structural details of Fig. 2 through Fig. 7.

Figure 2:
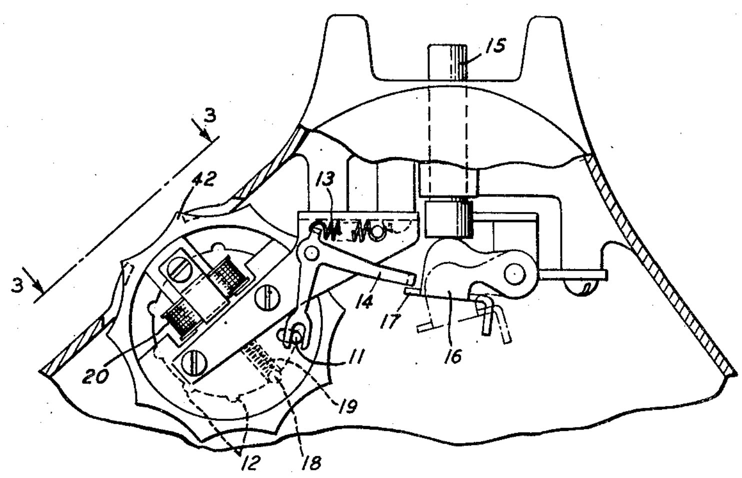
Fig. 2 is a partial cut-away end section of the station set shown in Fig. 1 illustrating the manner in which the signal generating components are assembled.
Figure 3:
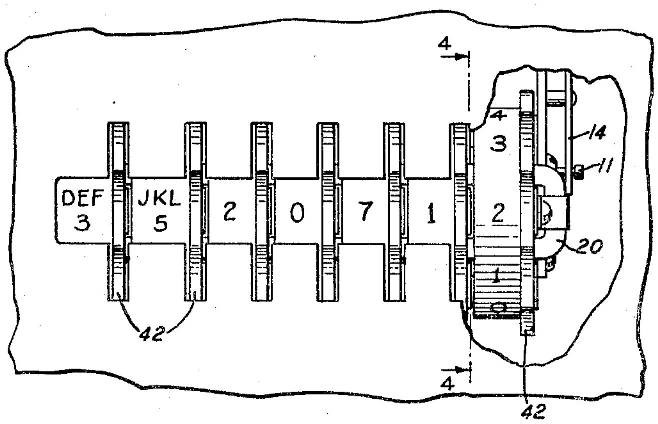
Fig. 3 is a plan view taken parallel to the line 3—3 of Fig. 2 illustrating the preset dials as they appear to a subscriber using the set. A portion of the cover plate is cut away in this view to better illustrate the manner in which the plurality of drum dials, each with its associated finger-wheel, is placed beneath the viewing window and operating slots within the enclosing station case.

Fig. 2 illustrates one possible method of providing a mechanical lock to prevent rotation of the dialing wheels after the handset is removed from the cradle. As was mentioned in the introductory portion of this specification, one of the objects of the invention is to provide a system wherein by preset dialing means the subscriber is enabled to complete his entire dialing operation at his own leisure before calling in a central office register. This is done by rotating the finger wheels, which are clearly illustrated in Figs. 1 and 3, until the number of the station to be called appears in the window slot. In the preferred embodiment herein disclosed this must be done with the receiver handset resting normally in its cradle. When the handset is lifted the station is instantly connected with the central office, and if an idle register is immediately available the selected reeds in the subscriber's station set are instantaneously energized by reception of the multifrequency signal source over the line. Within a fraction of a second thereafter this energizing signal is automatically removed from the line, as previously explained in reference to Fig. 9, and the vibrating reeds in the subscriber's station set have transmitted the selected fourteen-frequency signal back to the office where it is instantaneously registered. Since this entire signaling operation may be completed in a fraction of a second, in those instances when a register is immediately available, it may not be necessary to provide the code wheel locking mechanism illustrated by the drawing of Fig. 2, because any manipulation of the code wheel after the handset has been lifted would occur too late to affect the calling signal already transmitted.

However, because an idle register may not be immediately available it may be considered desirable to provide some such locking device as that illustrated by rod 11 which extends along a line perpendicular to the plane of the drawing in Fig. 2 and is common to all the code wheels, being adjacent to one of the notches 12 in each wheel but normally disengaged from said notches by the tension of spring 13 acting through rocker arm 14. It will be apparent from Fig. 2 that when the handset is removed from its cradle the handset pin 15 rises in response to spring pressure upon rocker arm 16, the extension 17 of which interacts with rocker arm 14 in its upward traverse to move the locking rod 11 into engagement with all the code wheels. Fig. 2 also illustrates how a detent ball 18 is forced by compression spring 19 into various of the notches 12 as the code wheel is revolved thus centering the code wheel properly in any selected position. An end view of the common inductance coil represented by L1 in the schematic drawing of Fig. 8 is seen at 20 in Fig. 2. A top view of the same end of this coil 20 may be seen in Fig. 3.

Figure 4:
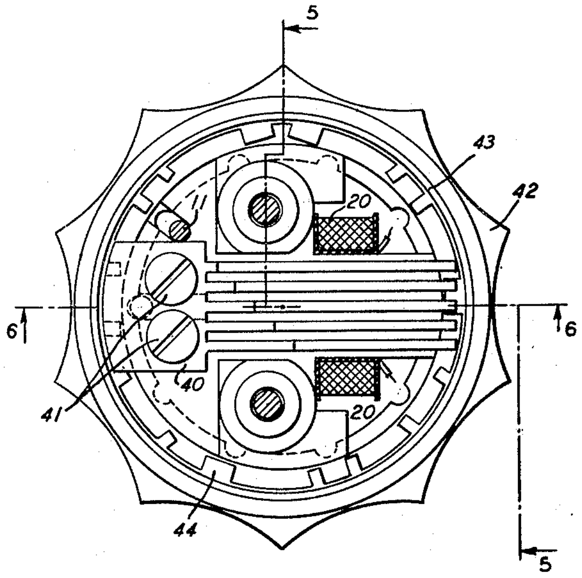
Fig. 4 is a sectional view of a single dial drum taken along the line 4—4 of Fig. 3 and showing a set of tuned reeds, code wheels and section of encompassing coil, all enclosed within the drum.

Referring now in greater detail to Fig. 4 of the drawing we see the assembly of one set of five magnetic reeds 40 within a single code wheel, as shown here in the preferred arrangement held rigidly positioned by mounting screws 41. The surrounding inductance coil 20 is here seen in cross-section as it encompasses all the reeds of the set. Adjacent to the free end of these magnetic reeds, and enclosed in the molded finger wheel 42, is a magnetic code ring 43 having a plurality of coded protrusions as shown at 44. These protrusions are so arranged that in each successive position of the finger wheel as it is rotated, two out of five of the tuned reeds are brought into close magnetic proximity to adjacent protrusions on the magnetic ring. In this way a lower reluctance magnetic path is established between the magnetic code ring 43 and a different pair of tuned reeds within the drum for each of the ten different rotational positions of the finger wheel 42.

The selected pair of reeds thus closely coupled respond to the multifrequency alternating-current energy, which is supplied from the central office to the inductance coil 20, by vibrating at their resonant frequencies. The remaining reeds in the set which are not so closely coupled do not receive the same magnetic driving force from the energy flowing through coil 20 and therefore do not attain any appreciable amplitude of vibration. Accordingly, when the multifrequency power supply at the central office is removed from the line and the line is instantly connected to the multifrequency register disclosed by the schematic drawing of Fig. 10, the selected pair of reeds in each code wheel which have attained their maximum amplitude of vibration continue to vibrate for a brief interval and in so doing vary the reluctance of their magnetic circuits with the code ring 43 at a frequency corresponding to their vibratory periods. This variation of magnetic field induces an electrical current of corresponding frequency in the coil 20, which now acts as a pick-up device rather than as a driving coil, and the electrical currents thus induced are transmitted from the subscriber's station over the line to the central office where they are registered in the manner previously described in reference to the schematic drawings of Figs. 8, 9 and 10.

Figure 5:
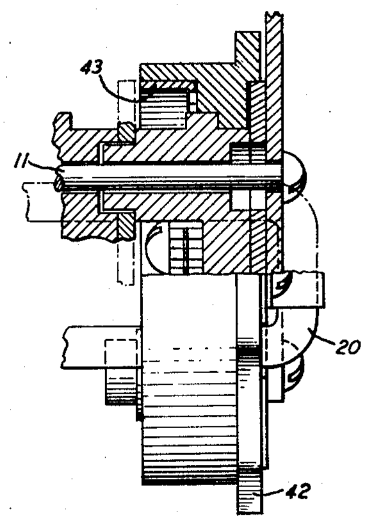
Fig. 5 is a partial end section of the drum wheel illustrated by Fig. 4 taken along the line 5—5.
Figure 6:
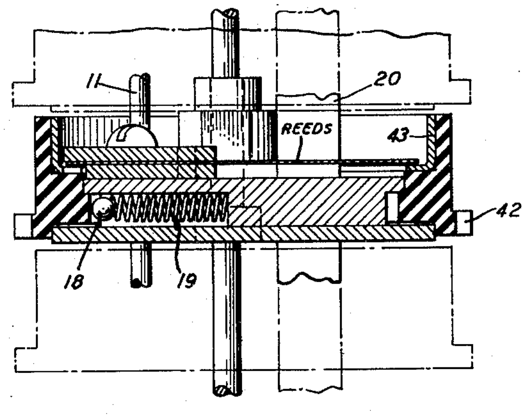
Fig. 6 is a top sectional view of the drum wheel shown in Fig. 4 as viewed along the line 6—6.
Figure 7:
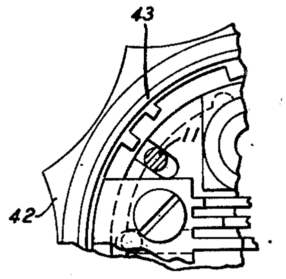
Fig. 7 is a detail of the upper left quarter of the drum wheel illustrated by Fig. 4 showing the code wheel lock in operated position.

The partially cut-away detail drawings of Figs. 5, 6 and 7 illustrate in greater detail portions of the drum wheel components discussed above in reference to Fig. 4, showing the assembled relation of the various parts.

It is to be understood that the invention is not limited to the particular preferred embodiment of the subscriber's station set illustrated herein but that many other arrangements of structural elements may be made within the scope of the invention. For example, the tuned reeds may be plucked mechanically rather than electrically, or they may be set in motion by sharply defined direct-current pulses rather than by the plurality of alternating-current tones as herein proposed. Many other variations of structure and circuit may be made without departing from the scope of the invention as defined by the appended claims.

What is claimed is:

1. A telephone system comprising a subscriber station set having means manually settable under the control of a subscriber for conditioning said station to generate a selected combination of signals of distinctive characteristics, a central office connected with said subscriber station and others of like kind, means at said central office for transmitting electrical energy to said subscriber station whereby said station is caused to generate said selected combination of signals of distinctive characteristics, means at said central office for interrupting transmission of said electrical energy after a measured interval of time, means at said central office to receive said selected combination of signals of distinctive characteristics generated at said subscriber station, and register means at said central office to selectively operate a plurality of register relays corresponding to the selected setting of said subscriber station.

2. A telephone system comprising a subscriber station set having means manually settable under the control of a subscriber for conditioning said station set to generate simultaneously a selected plurality of signals of distinctive frequency characteristics, a central office connected with said subscriber station, means at said central office for transmitting electrical energy including corresponding frequency characteristics to said subscriber station whereby said station is caused to generate said selected plurality of signals of distinctive frequency characteristics, means at said central office for interrupting transmission of said energy after a measured time interval, means at said central office to receive said simultaneously generated plurality of signals from said subscriber station, and register means at said central office responsive to said received signals from said subscriber station to simultaneously operate a selected plurality of register relays corresponding to said selected plurality of distinctive signals from said subscriber station.

3. A selective signaling system having an outlying station connected with a central office comprising frequency selective receiving means, further means at said central office for generating a plurality of different frequency signals simultaneously, selective generating means at said outlying station manually settable under the control of a subscriber, said selective generating means responsive to energization by said plurality of different frequency signals from said central office to simultaneously generate a selected combination of said signal frequencies, said selective receiving means at said central office including a means for receiving simultaneously said selected combination of signal frequencies generated at said outlying station and to control the operation of a selected plurality of relays.

4. In a telephone system, a subscriber's station set comprising a plurality of differently tuned vibratile reed members arranged in a plurality of separate groups, manually adjustable means associated with each group of reeds by which selected combinations of said reeds are rendered operative, an electrical coil inductively coupled with all of said reeds in such manner as to have an electrical current induced therein when said selected reeds are vibrated, a central office comprising a plurality of generators adapted to generate signals of frequencies corresponding to the tuning of all reeds in said station set, a line connecting the coil in said station with said office, means at said office for simultaneously applying all of said signals generated thereat to said line whereby said selected reeds of said station are simultaneously vibrated, means at said office for interrupting transmission of signals therefrom, and further means at said office comprising a plurality of vibratile reed selectors corresponding in number and frequency tuning to all of said station reeds, said selectors at said office responsive to simultaneously received signals from said station as generated by vibration of said preselected station reeds.

5. In a telephone system, a subscriber station connected to a subscriber line, said subscriber station comprising a plurality of frequency selecting devices each selective of different frequencies and each conditionable to be excited by its selected frequency to be rendered capable of generating current of a corresponding frequency, means operable by the subscriber for so conditioning selected combinations of said devices to respond to their respective frequencies arriving over said subscriber line, a central office to which said subscriber line extends, means in said central office common to a plurality of subscriber lines for seizing said subscriber line in response to a call-establishing condition at said subscriber station, said means in said central office including devices for generating all the frequencies to which said devices at said subscriber station are capable of responding and for applying said frequencies to said subscriber line, said means in said central office also including means preparable for the reception of the particular frequencies represented by the combination of said devices conditioned by said subscriber-operable means.

6. In a telephone system, subscriber stations normally in a non-call establishing condition, a central office, individual lines from said stations to said office, a call-establishing means at each of said stations for placing a call-establishing condition on the line connected thereto, said call-establishing means at each said station also including a signal means for producing selected combinations of frequencies of voltage and for applying said selected combinations of frequencies of voltage to the line connected thereto, said signal means at each said station being manually settable by the subscriber to select a desired combination of frequencies of voltage and being responsive to signal currents received over the line from said central office, setting-up means at each said station operable by a subscriber thereat for setting said signal means to select a combination of frequencies of voltage representing the line to be called, common means common to a plurality of said lines at said central office comprising current senders, and current responders, switching means operable upon operation of said setting-up means at one of said stations followed by the operation of said call-establishing means at said one of said stations for connecting said common means to the line serving said one of said stations, means operable in response to the completion of the connection of said common means to said line serving said one of said stations to cause said current senders to send currents over the line to said one of said subscriber stations, further means in said common means for interrupting the transmission of said currents from said current senders after a measured interval of time and preparing said current responders to respond selectively to currents as determined by said selected frequencies of voltage received over said line from said one of said stations.

7. A telephone switching system comprising means at a subscriber's station for simultaneously generating a plurality of signals of different frequencies, means under the control of a subscriber for presetting said first means to simultaneously generate a selected plurality of said frequencies, certain of said selected plurality of said frequencies designating a called office code and other of said selected plurality of said frequencies designating a called station code, a central office, a first common control means at said central office for selecting a trunk route to a called office, a second common control means at said central office for controlling the establishment of a connection to a called station in said called office over said trunk route to said called office selected by said first common control means, means in said first common control means for simultaneously receiving the frequencies of said selected plurality of said frequencies designating said called office code and for registering said called office code, means in said second common control means for simultaneously receiving the frequencies of said selected plurality of said frequencies designating said called station code and for registering said called station code, said frequencies designating said called office code being received by said means in said first common control means at the same instant as said frequencies designating said called station code are being received by said means in said second common control means.

8. A telephone switching system comprising a plurality of tuned reed generators at a subscriber's station, each of said reeds adapted to generate a different frequency signal, means under the control of a subscriber for conditioning selected groups of said reeds to simultaneously generate a selected plurality of signals of different frequency, said selected plurality of signals of different frequency representing the office code and station code of a called subscriber's directory designation, a central office, means at said central office for causing said selected reeds to simultaneously generate said selected plurality of signals of different frequency, certain of said selected plurality of signals designating the called office code of said called subscriber's directory designation and the other of said selected plurality of signals designating the station code of said called subscriber's directory designation, a first common control means at said central office for selecting a trunk route to a called office, a second common control means at said central office for controlling the establishment of a connection to a called station in said called office over said trunk route to said called office selected by said first common control means, means in said first common control means for simultaneously receiving the signals of said selected plurality of signals designating said called office code and for registering said called office code, means in said second common control means for simultaneously receiving the signals of said selected plurality of signals designating said called station code and for registering said called station code, said signals designating said called office code being received by said means in said first common control means at the same instant as said signals designating said called station code are being received by said means in said second common control means.

9. A telephone switching system comprising a subscriber station set having means manually settable under control of a subscriber for conditioning said station set to generate simultaneously a selected plurality of signals of distinctive frequency characteristics, certain of said signals of distinctive frequency characteristics designating a called office code and other of said signals of distinctive frequency characteristics designating a called station code, a central office connected with said subscriber station, means at said central office for transmitting electrical energy including corresponding frequency characteristics to said subscriber station whereby said station is caused to generate said plurality of signals of distinctive frequency characteristics, means at said central office for interrupting said transmission of said energy after a measured time interval, a first common control means at said central office for selecting a trunk route to a called office, a second common control means at said central office for transmitting signals over said trunk route to said called office selected by said first common control means to control the establishment of a connection to a called station in said called office, means in said first common control means for simultaneously receiving said signals of distinctive frequency characteristics designating said called office code and for registering said called office code, means in said second common control means for simultaneously receiving said signals of distinctive frequency characteristics designating said called station code and for registering said called station code, said signals of distinctive frequency characteristics designating said called office code being received by said means in said first common control means at the same instant as said signals of distinctive frequency characteristics designating said called station code are being received by said means in said second common control means.

10. In a telephone system, equipment in a central office common to a plurality of lines, at least one subscriber station upon each said line, means operable under control of a said subscriber station for temporarily seizing said equipment and allocating it for the use of such said line, said equipment including signal frequency sending devices and signal frequency responding devices, and switches for first connecting said signal frequency sending devices to said line and immediately thereafter connecting said signal frequency responding devices to said line.

11. In a system in accordance with claim 10, means at said subscriber station presettable selectively, said presettable means when preset being operable under control of signal frequencies sent from said signal frequency sending devices over said line to produce and send back over said line to said signal frequency responding devices signals of frequencies selectively chosen according to said presetting.

12. In a telephone central office, a subscriber line, signal sending means at said central office connectable to said subscriber line for sending a group of signals of different frequencies over said line, means for terminating sending of signals from said signal sending means after a predetermined interval of time, a register, and means operable substantially instantly upon operation of said terminating means for connecting said register to said line.

13. In a telephone system, a subscriber station, a line therefrom to a central office, signal generators at said central office, means operable over said line under control of said subscriber station to cause said signal generators to send signals over said line toward said subscriber station, circuit switches operable to control termination of sending said signals to said subscriber station after a measured time interval, a register means, and means controlled by operation of said circuit switches to connect said register means to said line.

14. In a combination according to claim 13, wherein said register means includes selective means capable of selectively receiving a group of signal frequencies representing a called station directory number.

15. In a combination according to claim 14, wherein said register means includes a section for registering selectively an office designation of a called subscriber directory number, and a section for registering the station designation of said called subscriber directory number.

References Cited in the file of this patent

UNITED STATES PATENTS

| Number | Name | Date |
|---|---|---|
| 2,164,335 | Mathes | July 4, 1939 |
| 2,244,500 | Nyquist | June 3, 1941 |
| 2,300,622 | Hickman | Nov. 3, 1942 |
| 2,317,191 | Holbrook | Apr. 20, 1943 |
| 2,317,471 | Meachem | Apr. 27, 1943 |
| 2,346,305 | Hickman et al. | Apr. 11, 1944 |
| 2,354,668 | Deakin et al. | Aug. 1, 1944 |
| 2,554,201 | Lundkvist | May 22, 1951 |